United States Patent [19]
Waskiewicz

[11] Patent Number: 5,857,782
[45] Date of Patent: Jan. 12, 1999

[54] BEARING ASSEMBLY INSERT AND HOUSED SELF ALIGNING BEARING ASSEMBLY

[75] Inventor: Walter P. Waskiewicz, Bristol, Conn.

[73] Assignee: The Torrington Company, Torrington, Conn.

[21] Appl. No.: 799,723

[22] Filed: Feb. 12, 1997

Related U.S. Application Data

[63] Continuation of Ser. No. 513,491, Aug. 10, 1995, abandoned.

[51] Int. Cl.$^6$ .......................... F16C 33/04; F16C 23/04; F16C 19/24
[52] U.S. Cl. ...................... 384/493; 384/497; 384/498; 384/557; 384/905
[58] Field of Search .................. 384/192, 206, 384/208, 209, 210, 278, 493, 495, 496, 497, 498, 557, 905

[56] References Cited

U.S. PATENT DOCUMENTS

| | | |
|---|---|---|
| 2,804,679 | 9/1957 | Tracy . |
| 2,938,754 | 5/1960 | Lombard . |
| 3,202,466 | 8/1965 | Kaptur . |
| 3,317,258 | 5/1967 | Hermann . |
| 3,326,613 | 6/1967 | Renker . |
| 3,449,032 | 6/1969 | Scheufler . |
| 3,692,372 | 9/1972 | Pineo . |
| 4,223,959 | 9/1980 | Oldendorph . |
| 4,353,615 | 10/1982 | Kramer et al. . |
| 4,473,309 | 9/1984 | Box . |
| 4,712,661 | 12/1987 | Lederman et al. . |
| 4,830,157 | 5/1989 | Lederman . |
| 4,848,934 | 7/1989 | Blakely et al. . |
| 5,028,152 | 7/1991 | Hill et al. . |
| 5,073,039 | 12/1991 | Shervington . |
| 5,090,823 | 2/1992 | Lindsey et al. . |
| 5,192,137 | 3/1993 | Renard . |
| 5,197,808 | 3/1993 | Takata . |

FOREIGN PATENT DOCUMENTS

| | | |
|---|---|---|
| 2 257 041 | 8/1975 | France . |
| 446 847 | 3/1968 | Germany . |
| 00 181 20 | 2/1981 | Japan . |
| 56-18120 | 2/1981 | Japan . |
| 1 051 19 | 8/1981 | Japan . |
| 0 164 224 | 12/1981 | Japan . |
| 0 149 619 | 9/1982 | Japan . |
| 0 020 113 | 1/1991 | Japan . |
| 0 365 438 | 1/1932 | United Kingdom . |

*Primary Examiner*—Charles A. Marmor
*Assistant Examiner*—Matthew A. Kaness
*Attorney, Agent, or Firm*—John C. Bigler

[57] ABSTRACT

A two-piece annular bearing ring seat with an annular concave spherical inside surface is adapted to slidably receive a spherical outer surface of a bearing ring. An annular strap having a coefficient of thermal expansion higher than the coefficient of thermal expansion of a bearing housing holds the bearing ring seat and annular strap together as a subassembly. The subassembly can be press fit into the housing to provide a housed self-aligning bearing.

8 Claims, 3 Drawing Sheets

BEARING ASSEMBLY INSERT AND HOUSED SELF ALIGNING BEARING ASSEMBLY

This is a continuation of application Ser. No. 08/513,491, filed Aug. 10, 1995 abandoned.

BACKGROUND OF THE INVENTION

This invention relates generally to bearing assemblies. More particularly, this invention is a new bearing assembly combination which includes an insert with a strap having a coefficient of thermal expansion higher than the coefficient of thermal expansion of the housing of the bearing assembly.

Self-aligning housed bearing units are used where they are subjected to misalignment. Also, often the housing in which the self-aligning housed bearing units are placed is made of material having a higher coefficient of expansion than the coefficient of thermal expansion of the bearing material. When these conditions exist, special bearing mounting provisions are required to eliminate the detrimental, high stresses imposed by misalignment and the possible loss of bearing retention due to unequal thermal growth. Thus, a self-aligning bearing assembly which includes structure which compensates to offset the effects of unequal thermal growth between the bearing and the housing so that the bearing assembly remains firmly fixed within the housing under all expected thermal conditions is highly desirable.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing assembly with a stationary housing made of a material having a predetermined coefficient of thermal expansion. Included in the housing is a bearing having a ring with a spherical outer surface. An insert is mounted between the outer surface of the bearing and the inner surface of the housing. The insert comprises an annular strap holder with an annular concave spherical inside surface adapted to slidably retain the spherical outer surface of the bearing ring. A strap having a coefficient of thermal expansion higher than the coefficient of thermal expansion of the housing is mounted on the annular strap holder.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

In the various drawing figures, like parts are referred to by like numbers.

Figure 1:
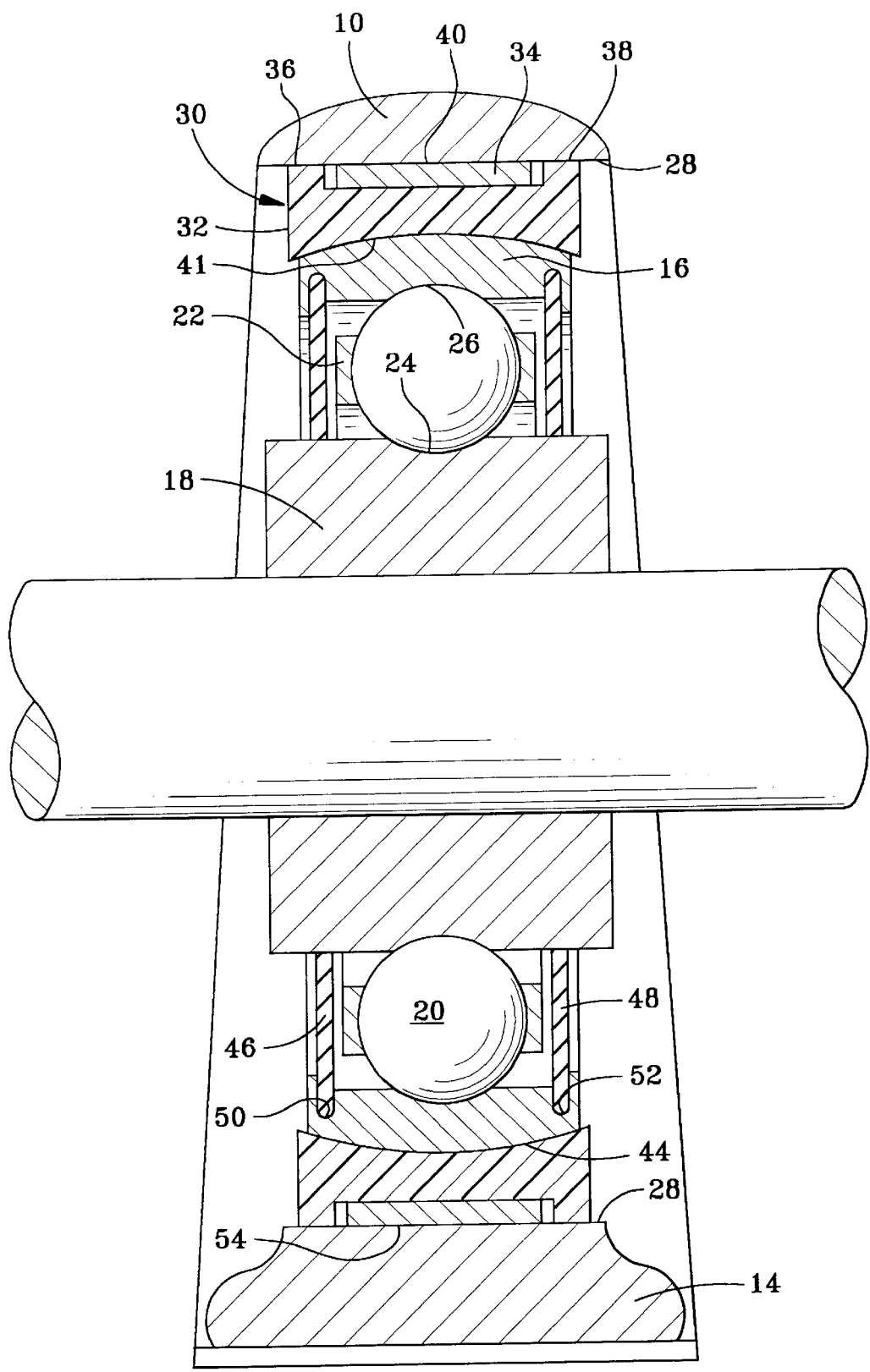
FIG. 1 is a side elevation view, partly in section, of the bearing assembly.

Referring to FIG. 1, the bearing assembly includes a housing 10 which is made of material having a predetermined coefficient of thermal expansion and includes a base 14 having means (not shown) for attachment of the assembly to a supporting surface. A ball bearing is included in the bearing assembly. The ball bearing has an outer ring 16 and an inner ring 18. Balls 20, retained by a conventional ball cage 22, are in rolling contact with raceway 24 on the inner ring 18 and raceway 26 on outer ring 16.

The stationary housing 10 has a bore 28 extending entirely through the stationary housing. The surface of the housing bore has a constant inside diameter throughout its length, hence, the housing can be manufactured much easier and much cheaper than the housing bores which have concave or spherically shaped inside surfaces.

An insert 30 is fixedly retained in the housing 10. The insert may be press fit or have an interference fit in the housing 10. The insert 30 includes an annular bearing ring seat 32 and an annular strap 34. The strap 34 is made of a material having a coefficient of thermal expansion higher than the coefficient of thermal expansion of the housing 10. The radially outside surfaces 36 and 38 of the annular bearing ring seat and the radially outside surface 40 of the strap are complementary with the stationary housing 10 inner surface.

The annular 32 has an annular concave spherical inside surface 41. The bearing ring 16 is slidably retained in the insert 30 and has a spherical outer surface 44 corresponding in shape to the annular concave spherical inside surface 41.

Seals 46 and 48 may be fit into grooves 50 and 52, respectively, adjacent each axial end of the ring 16.

Figure 2:
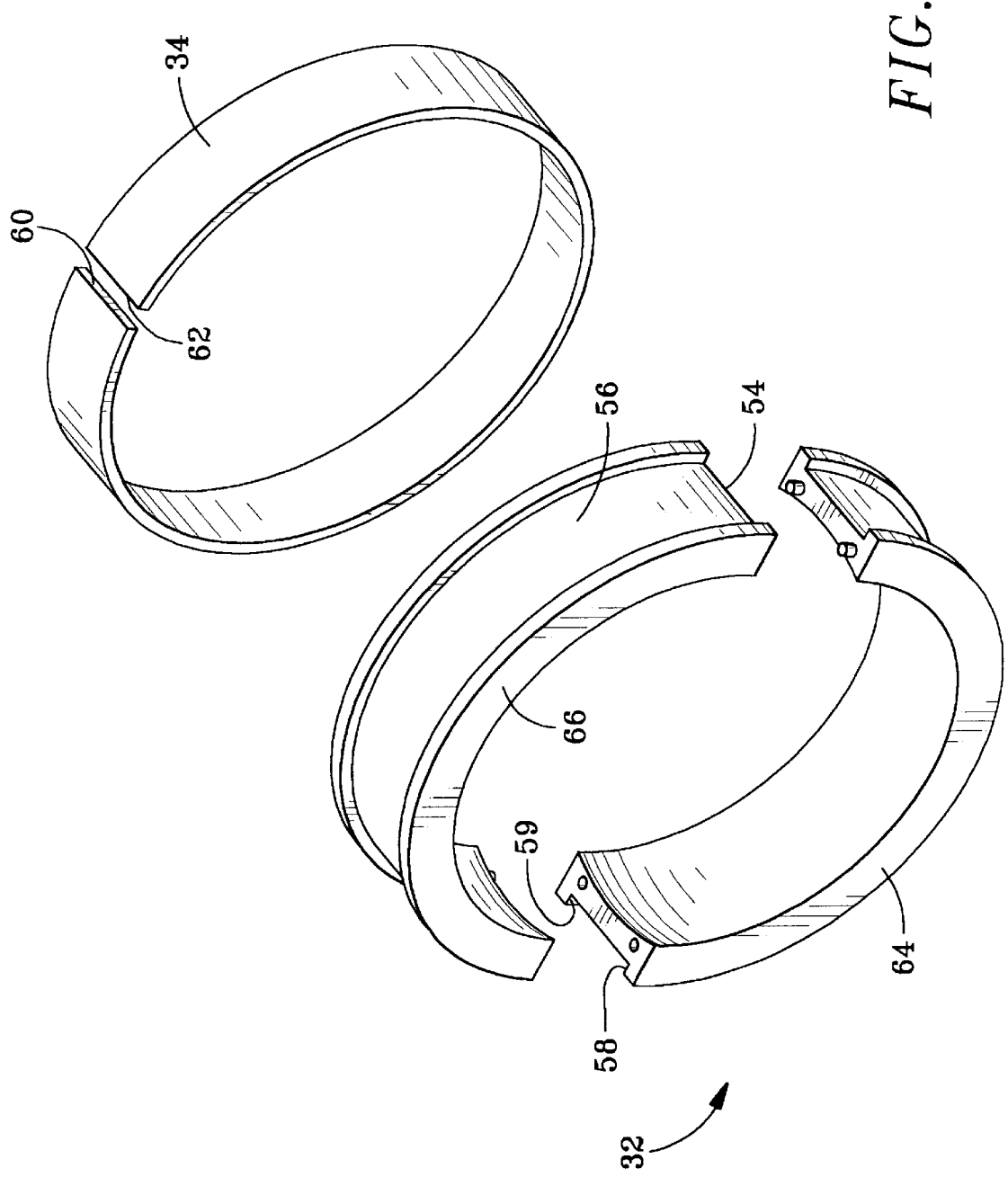
FIG. 2 is an exploded view of the components of the insert.
Figure 3:
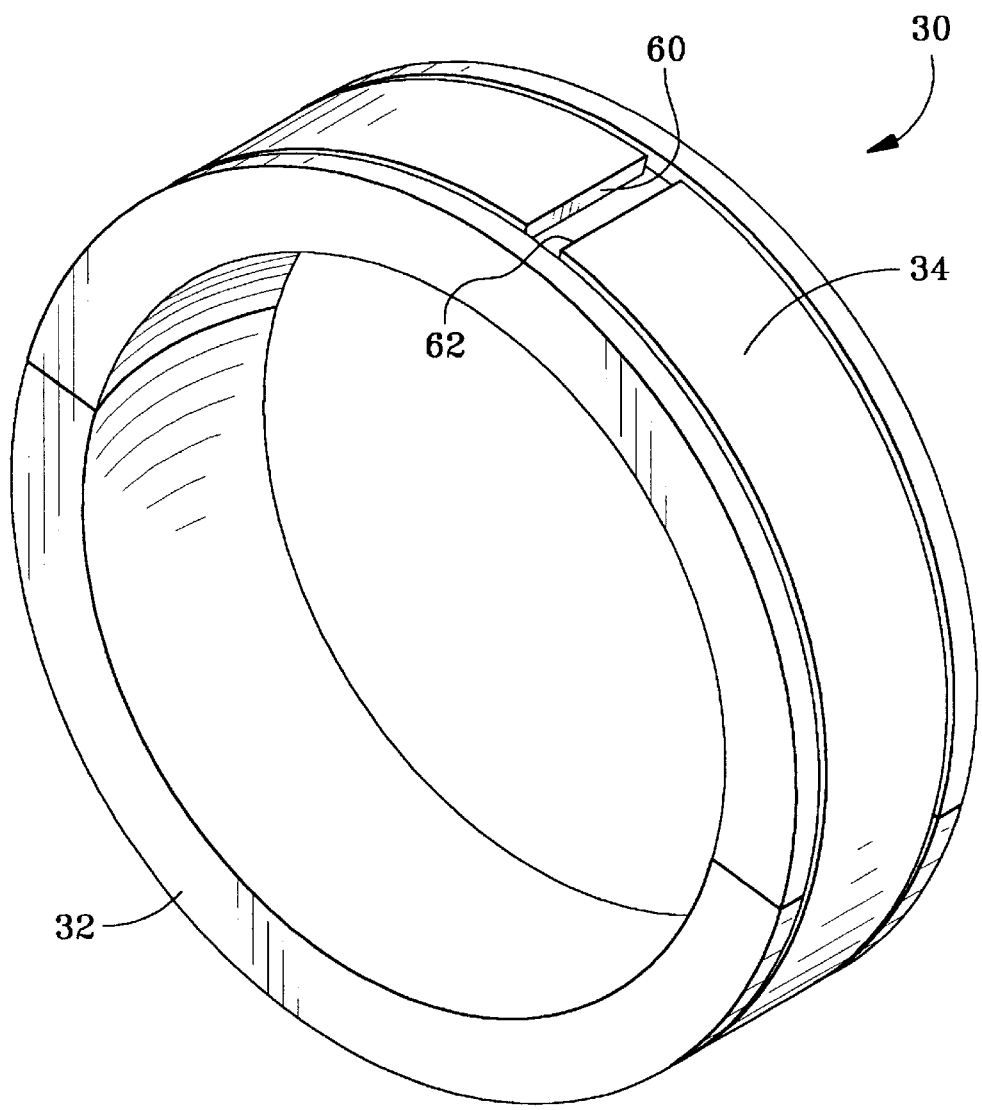
FIG. 3 is a perspective view of the insert.

Referring to FIG. 2 and FIG. 3, the bearing ring seat 32 has an annular groove 54. The axially extending axially spaced radially extending base surface 56 and the end surfaces 58 and 59 of the annular groove are shaped to provide an annular groove of constant depth along its circumference and throughout its axial length.

The dimensions of the radial thickness and axial length of the strap 34 are substantially the same as the dimensions of the two axially spaced radially extending surfaces and axially extending base surface, respectively, of the strap holder groove 54. The circumferential ends 60 and 62 of the strap 34 are circumferentially spaced apart to allow for thermal expansion.

If desired, the annular bearing ring seat may be made of two identical semi-circular halves 64 and 66. The bearing ring seat may be made of material that can effectively be made into the configuration required and possesses the physical properties needed to meet the demands of bearing applications. Many polymers or powder metal alloys could be used to make the bearing ring seat depending on specific application operating conditions.

The strap 34 is made of a material which is capable of deforming and snapping into the bearing ring seat groove 54 to assure the assembly remains together prior to installation and to provide an expansion compensator to offset the effects of unequal thermal growth between the insert 30 and the housing 10. The strap could be made of materials, such as nylon or aluminum, that have high coefficients of thermal expansion.

A preassembled insert and bearing can be press fit into a standard bearing housing. At room temperature, the interference fit provides typical retention and the spherical interfaces allow for alignment. As operating temperatures rise and the housing expands, the insert will maintain installation interference due to the more rapid expansion of the strap 34. The strap material can be selected on a case by case basis depending on the housing material, and anticipated operating temperatures.

Having described the invention, what is claimed is:

1. An insert for a housed self-aligning bearing assembly in combination with a bearing, the combination comprising:

a bearing ring having a spherical outer surface;

a multi-piece annular bearing ring seat with an annular concave spherical inside surface slidably receiving the spherical outer surface of the bearing ring; and an annular strap mounted on the bearing ring seat such that the bearing ring seat and annular strap are held together as a subassembly.

2. An insert for a housed self-aligning bearing assembly in accordance with claim 1 wherein:

the two-piece annular bearing ring seat has an annular groove around its outer surface; and the annular strap is resiliently biased into the annular groove.

3. An insert for a housed self-aligning bearing assembly in accordance with claim 2 wherein:

the annular groove is formed by two axially spaced radially extending end surfaces and an axially extending cylindrical bottom surface; and the strap has a rectangular longitudinal cross-section such that the strap conforms to the annular groove.

4. An insert for a housed self-aligning bearing assembly in accordance with claim 1 wherein the strap is split longitudinally to provide two adjacent ends, the adjacent ends of the strap being circumferentially spaced apart to allow for thermal expansion.

5. A housed self-aligning bearing assembly comprising:

a housing made of material having a coefficient of thermal expansion and having a cylindrical bore;

an insert press fit into the cylindrical bore of the housing, the insert comprising a multi-piece annular bearing ring seat with an annular concave spherical inside surface and an annular groove around its outer surface, and an annular strap having a coefficient of thermal expansion higher than the coefficient of thermal expansion of the housing located within the annular groove and providing an interference fit with the housing; and a bearing having a ring with a spherical outer surface slidably received within the concave spherical inside surface of the bearing ring seat.

6. A housed self-aligning bearing assembly in accordance with claim 5 wherein the annular strap is resiliently biased into the annular groove.

7. A housed self-aligning bearing assembly in accordance with claim 6 wherein:

the annular groove is formed by two axially spaced radially extending end surfaces and an axially extending cylindrical bottom surface; and the strap has a rectangular longitudinal cross-section such that the strap conforms to the annular groove.

8. A housed self-aligning bearing assembly in accordance with claim 6 wherein the strap is split longitudinally to provide two adjacent ends, the adjacent ends of the strap being circumferentially spaced apart to allow for thermal expansion.

* * * * *